United States Patent
Benthien et al.

(10) Patent No.: US 11,072,438 B2
(45) Date of Patent: Jul. 27, 2021

(54) FASTENING SYSTEM FOR FASTENING BUILT-IN ELEMENTS IN A CABIN OF A VEHICLE

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 277 days.

(21) Appl. No.: 16/376,753

(22) Filed: Apr. 5, 2019

(65) Prior Publication Data
US 2019/0329907 A1 Oct. 31, 2019

(30) Foreign Application Priority Data
Apr. 25, 2018 (DE) .......................... 102018109995.9

(51) Int. Cl.
*F16B 37/00* (2006.01)
*F16C 11/06* (2006.01)
(Continued)

(52) U.S. Cl.
CPC ................ *B64F 5/10* (2017.01); *B64C 1/066* (2013.01); *F16B 37/00* (2013.01); *F16C 11/0604* (2013.01); *B64D 11/00* (2013.01)

(58) Field of Classification Search
CPC ....... B64D 11/003; B64D 11/00; B64D 11/04; B64D 11/0696; B64D 2011/0046; B64D 9/00; B64D 9/003; F16C 11/0604; F16C 11/06; F16C 11/0647; F16C 11/0642; F16C 11/0609; F16B 5/0216; F16B 5/0241; F16B 5/0225; F16B 5/025; F16B 5/0614;
(Continued)

(56) References Cited

U.S. PATENT DOCUMENTS 2,853,112 A 9/1958 Jules
3,382,630 A * 5/1968 Chivers ................. E06B 3/5436
52/208
(Continued)

FOREIGN PATENT DOCUMENTS

DE 102007018326 A1 10/2008
EP 2538035 A2 12/2012
(Continued)

*Primary Examiner* — Victor D Batson
*Assistant Examiner* — Amit Singh Dhillon
(74) *Attorney, Agent, or Firm* — Jenkins, Wilson, Taylor & Hunt, P.A.

(57) ABSTRACT

A fastening system has a fastening element and at least one fastening device having a flanged housing, a closure element, a hollow-sphere element and a spherical insert. The hollow-sphere element pivots about a first pivoting axis relative to the flanged housing, while the spherical insert pivots about a second pivoting axis in the hollow-sphere element. First engagement means in an opening of the spherical insert are of complementary design to second engagement means of the fastening element. The first and second engagement means are designed such that, in a first rotational position, the fastening element can be inserted freely into the opening and, in a second rotational position, the first and second engagement means engage in one another.

13 Claims, 3 Drawing Sheets

(51) Int. Cl.
   *B64D 11/00* (2006.01)
   *B64F 5/10* (2017.01)
   *B64C 1/06* (2006.01)

(58) Field of Classification Search
   CPC ........ F16B 43/02; F16B 37/00; F16B 37/085; B64F 5/10; B64C 1/066
   USPC .................................................. 411/380, 537
   See application file for complete search history.

(56) References Cited

U.S. PATENT DOCUMENTS

| | | |
|---|---|---|
| 5,795,122 A | 8/1998 | Bowers |
| 2010/0066152 A1 | 3/2010 | King et al. |
| 2012/0328365 A1* | 12/2012 | Care ..................... F01D 21/045 403/337 |
| 2015/0328946 A1* | 11/2015 | von der Haar ......... F16C 11/06 403/76 |
| 2015/0369275 A1* | 12/2015 | Hsieh .................... F16B 5/0241 411/322 |
| 2016/0356309 A1* | 12/2016 | Tsai ..................... F16C 11/0647 |
| 2017/0015016 A1* | 1/2017 | Myrhum, Jr. ............ B26F 1/386 |
| 2017/0343023 A1* | 11/2017 | Schevers ................. F16B 5/025 |
| 2017/0350437 A1 | 12/2017 | Benthien et al. |
| 2018/0009530 A1 | 1/2018 | Benthien |
| 2019/0113071 A1* | 4/2019 | Goellner ............. F16C 11/0604 |
| 2019/0193871 A1* | 6/2019 | Benthien .............. B64D 11/003 |
| 2019/0217679 A1* | 7/2019 | Kuroda .................. F16C 11/06 |

FOREIGN PATENT DOCUMENTS

| | | |
|---|---|---|
| EP | 3266705 A1 | 1/2018 |
| GB | 920925 A | 3/1963 |
| WO | 02090786 A1 | 11/2002 |
| WO | 2014088600 A1 | 6/2014 |

* cited by examiner

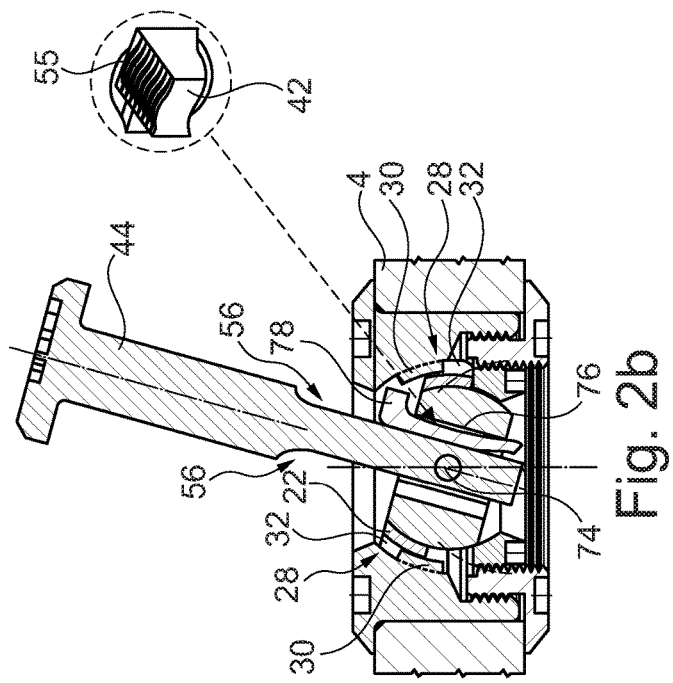
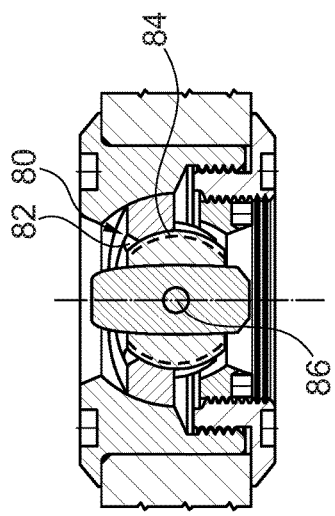
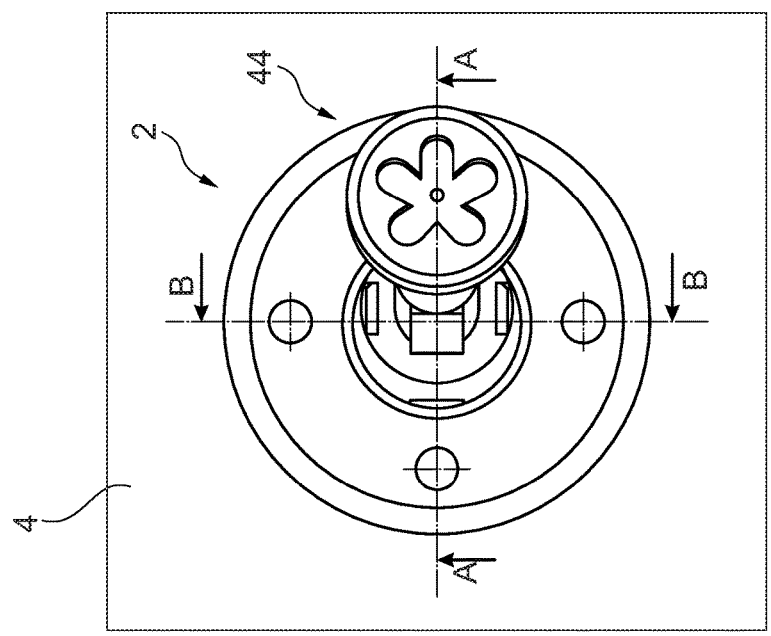

FASTENING SYSTEM FOR FASTENING BUILT-IN ELEMENTS IN A CABIN OF A VEHICLE

CROSS-REFERENCE TO PRIORITY APPLICATION

This application claims the benefit of, and priority to, German patent application number DE 102018109995.9, filed Apr. 25, 2018. The content of the referenced application is incorporated by reference herein.

TECHNICAL FIELD

Embodiments of the subject matter described herein relate generally to a fastening system for fastening built-in elements in a cabin of a vehicle. The embodiments of the invention further relate to a cabin for a vehicle, in which a built-in element having a fastening system of this kind is fastened. The embodiments of the invention further relate to a vehicle, in particular an aircraft, which is equipped with a cabin of this kind.

BACKGROUND

Vehicles used to transport passengers generally have a multiplicity of built-in elements providing different functions. These are arranged in a cabin of the vehicle according to demand or requirements and fastened in such a way that the mass- and inertia-related loads on the built-in elements can be introduced reliably into the vehicle structure during all conceivable movements of the vehicle. Consequently, sufficiently strong and, at the same time, statically determined support for each built-in element has to be provided. A specific solution for a fastening device can be used, depending on the type and embodiment of the built-in element.

To enable individual equipment requirements of different operators of vehicles of the same design to be satisfied, modular built-in elements are often used. To avoid fully variable arrangement of fastening devices on a primary structure of the relevant vehicle, there is a known practice of creating continuous mechanical interfaces, allowing customized arrangement of fastening devices without affecting the primary structure. Thus, decoupling from the primary structure of the vehicle is a suitable way of customizing the arrangement of built-in elements.

There are, for instance, known fastening systems which are based on a rail structure having a rail connected to a vehicle structure, on which the built-in elements can be fixed by means of suitable fittings. There are known variants in which floor rails, used particularly for fastening passenger seats, are employed to fasten built-in elements on the floor.

EP 3 266 705 A1, for instance, shows a support system for a cabin of a vehicle for the arrangement of built-in elements.

BRIEF SUMMARY

It is the underlying object of the disclosure to propose a fastening system which allows decoupled fastening of a built-in element on a primary structure and can in a flexible manner ensure different relative positions between a fixing point in the cabin and the built-in element, even in the event of installation positions subject to tolerances.

The object is achieved by a fastening system for fastening built-in elements in a cabin of a vehicle having the features of independent Claim 1. Advantageous embodiments and developments can be found in the dependent claims and the following description.

A fastening system for fastening built-in elements in a cabin of a vehicle, having a fastening element and at least one fastening device is proposed, the fastening device having a flanged housing with an interior space formed therein, a closure element, a hollow-sphere element, which can be inserted into the interior space of the flanged housing, a spherical insert, which can be inserted into the hollow-sphere element and has an opening having first engagement means, wherein the interior space of the flanged housing has a first spherical bearing surface, which is designed to correspond to an outer surface of the hollow-sphere element to allow pivoting of the hollow-sphere element, wherein a first guiding device allows pivoting exclusively about a first pivoting axis, wherein the hollow-sphere element has on the inside a second spherical bearing surface, which is designed to correspond to an outer surface of the spherical insert to allow pivoting of the spherical insert, wherein a second guiding device allows pivoting exclusively about a second pivoting axis, wherein the closure element closes the interior space, at least in some section or sections, in such a way that the hollow-sphere element is held in the interior space, wherein the fastening element can be inserted into the spherical insert and has second engagement means, and wherein the first and second engagement means are designed in such a way that, in a first rotational position, the fastening element can be inserted freely into the opening and, in a second rotational position, the first and second engagement means engage in one another.

The flanged housing forms a basis for the fastening device which can be installed in a fixed manner. At one end, the flanged housing can have a flange, which, in particular, extends radially outwards beyond the remaining part of the flanged housing. Consequently, the flange can form a kind of stop, up to which the flanged housing can be inserted into an opening in a floor or wall surface in the cabin. The flanged housing preferably has a hollow-cylindrical housing section, which is completed on one side by the flange.

The closure element is used to close the interior space of the flanged housing, ensuring that the components situated therein, which are explained below, remain in the interior space. The closure element can preferably, but not necessarily, be positioned at an opposite end of the flanged housing from the flange. In a particularly simple case, the closure element can be designed as a ring or a cover.

The hollow-sphere element that can be inserted into the interior space can be embodied as an annular section of a ball, wherein the respective caps of the ball are missing. The hollow-sphere element is not of solid design but likewise surrounds a hollow space.

The interior space of the flanged housing can provide the hollow-sphere element with pivotable support with the aid of the first spherical bearing surface. The hollow-sphere element can adopt a free pivoting angle about its first pivoting axis, wherein the alignment of the pivoting angle depends on the first guiding device.

In the same way, the spherical insert is pivotably supported in the interior of the hollow-sphere element, wherein the free pivoting angle of the spherical insert relative to the hollow-sphere element depends on the second guiding device. Thus, overall, the flanged housing, the hollow-sphere element and the spherical insert form a type of universal joint since, depending on the embodiment of the two guiding devices, the spherical insert can be pivoted about two axes within the flanged housing.

The arrangement of the opening in the spherical insert, into which the fastening element can be inserted, enables the pivotability of the spherical insert to be exploited to achieve the desired alignment of the fastening element. The fastening element should be taken to mean a component which is in engagement with the built-in component to be fastened and is fixed on the opening of the spherical insert of the fastening device. The pivotability of the fastening element relative to the flanged housing of a fastening device enables a certain distance to be achieved between a fastening point on the built-in element and the fastening device, which can be positioned in a manner fixed relative to the structure on the vehicle. Nevertheless, any direction of force can be used for reliable and adequate force transmission into the vehicle structure.

In addition to the capacity for free alignment of the spherical insert in the flanged housing, another advantage may be regarded as the fact that the fastening element can be connected very easily to the opening and to the spherical insert. For this purpose, the first and second engagement means are provided, which are designed to correspond to one another. If the fastening element is inserted into the opening in the first rotational position and then moved into the second rotational position, inter-engagement of the engagement means is brought about. This means that the distance between the built-in element and the fastening device is to a certain extent variable. It is envisaged that the engagement means enter into engagement with one another independently of the insertion depth when the second rotational position is selected.

Overall, the fastening device according to the disclosure can therefore carry out introduction of force from a substantially arbitrary position into a fastening device attached in a fixed manner to the structure and can simultaneously carry out means for compensating assembly-related tolerances.

At this point, it may be observed that a simple spherical bush which is configured in a manner similar to a hollow-sphere element and is pivotably supported might be sufficient for attaching the fastening element to the built-in element. However, it is in particular conceivable and preferred to provide a second fastening device, through which a common fastening element extends. Consequently, the fastening system can comprise two fastening devices, wherein one is arranged on the built-in element and the other is arranged on the corresponding surface element in a manner fixed relative to the structure. By exploiting the first and second engagement means in both spherical inserts and the fastening element, the fastening element can be connected to both spherical inserts in such a way that all the assembly-related tolerances are compensated and the relative position, adopted during assembly, between the built-in element and a point fixed relative to the structure are rigidly maintained.

It should furthermore be noted here that, for the fixed connection of a built-in element to a surface element, a plurality of points fixed relative to the structure and a plurality of attachment points of the built-in element are included.

In an advantageous embodiment, the first pivoting axis and the second pivoting axis are perpendicular to one another. A joint which is practically fully universal and allows a completely arbitrary position of the spherical insert relative to the flanged housing is thereby made available. However, it should be noted here that it is preferable if neither of the two pivoting axes is provided in such a way that the hollow sphere and/or the spherical insert can only rotate about their own axis.

In an advantageous embodiment, the first pivoting axis and the second pivoting axis are perpendicular to a main direction of extent of the opening of the spherical insert. This makes it possible to exclude the possibility of one of these elements being rotated about an axis parallel to the fastening element. The fastening device therefore allows the insertion of the fastening element and the fixing thereof completely without the need to use a tool to hold the spherical insert. Particularly in the case of pivoting axes that are perpendicular to one another, completely arbitrary alignment of the spherical insert remains fully assured, however.

The fastening device can furthermore have a flanged nut with a first external thread, which can be screwed into a first internal thread of the flanged housing, thus enabling the flanged housing and the flanged nut to be fastened in a cutout of a surface component. The arrangement of the fastening device in a surface component, i.e. a wall or floor surface, can therefore be implemented by providing a cutout, inserting the flanged housing into the cutout and clamping the flanged housing with the flanged nut. The flanged nut preferably likewise has a flange which acts as an offset or stop. When the flanged nut is screwed into the flanged housing, a rim region around the cutout is therefore gripped in the manner of a pincer. The flanged housing is then arranged in a fixed manner on the surface element and allows effective introduction of force. As a particular preference, the flanged nut is likewise embodied as a hollow-cylindrical component, wherein a hollow-cylindrical section has the flange on one side.

The closure element preferably has, on a side facing into the interior space, a third spherical bearing surface, which is based on a radius of curvature that corresponds to a radius of curvature of the second spherical bearing surface, with the result that the second spherical bearing surface and the third spherical bearing surface are complementary, at least in some region or regions. Consequently, the hollow-sphere element and the closure element together form an enlarged spherical bearing surface. It is thereby possible to improve the mounting of the spherical insert in as much as pivotability is increased without necessarily having to enlarge the hollow-sphere element.

The fastening element is preferably elongate and the second engagement means are arranged exclusively on two mutually opposite longitudinal sides, wherein the first engagement means are arranged in a manner complementary thereto in the opening, allowing engagement to be established or released by rotating the fastening element about a longitudinal axis. The first and second engagement means can be embodied in the form of toothing, for example. The toothing can form a serrated structure. A kind of thread pitch is possible but not necessary. This arrangement gives rise in the profile cross sections of the fastening element and of the opening to two discrete mutually opposite toothed sections. In this case, the opening in the spherical insert is dimensioned in such a way that the fastening element can be rotated about its longitudinal axis in the opening and that engagement with the first engagement means takes place only in the second rotational position. In the first rotational position, the second engagement means of the fastening element are situated in the gaps of the opening between the first engagement means. As a result, free, unhindered insertion along the longitudinal axis of the fastening element and of the opening is conceivable.

When the second rotational position is occupied, these gaps are free. The fastening device preferably has at least one retaining pin, which can be inserted between an inner contour of the opening of the spherical insert and the fastening element in the second rotational position of the fastening element. As a result, this gap is largely filled and the fastening element is thereby prevented from rotating back into the first rotational position. Consequently, the retaining pin forms a retention device for preventing release of the fastening element which is of particularly simple construction mechanically.

In an advantageous embodiment, the retaining pin is designed to be elastically deformed and to enter into a nonpositive and/or positive joint with the opening and/or the fastening element when inserted into the opening. By virtue of this elastic deformability, accidental release of the retaining pin itself is simultaneously prevented. In this case, the retaining pin can wedge in the opening, for instance.

The fastening system preferably has two fastening devices, wherein the fastening element extends through the openings of the spherical inserts of both fastening devices. In this way, the advantages of the fastening devices both on the surface element fixed relative to the structure and also on the built-in element can be used and furthermore tolerance compensation by appropriate engagement of the first engagement means and the second engagement means on two regions of the fastening element can be accomplished.

The object is furthermore achieved by a cabin for a vehicle, having at least one surface element and at least one built-in element, which is connected to the at least one surface element by means of the abovementioned fastening system, wherein, for this purpose, the surface element has a cutout for the reception of the at least one fastening device.

The disclosure furthermore relates to a vehicle having a cabin of this kind. In an advantageous embodiment, the vehicle is an aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses of the present disclosure will be found in the following description of the embodiment examples and the figures. Here, all the features described and/or depicted, in themselves and in any desired combination, form the subject matter of the disclosure, even when considered independently of their combination in the individual claims or the dependency references thereof. In the figures, the same reference signs furthermore stand for identical or similar objects.

FIGS. 2a, 2b and 2c show a plan view (FIG. 2a) and two different vertical sectional views (FIGS. 2b and 2c).

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1A:
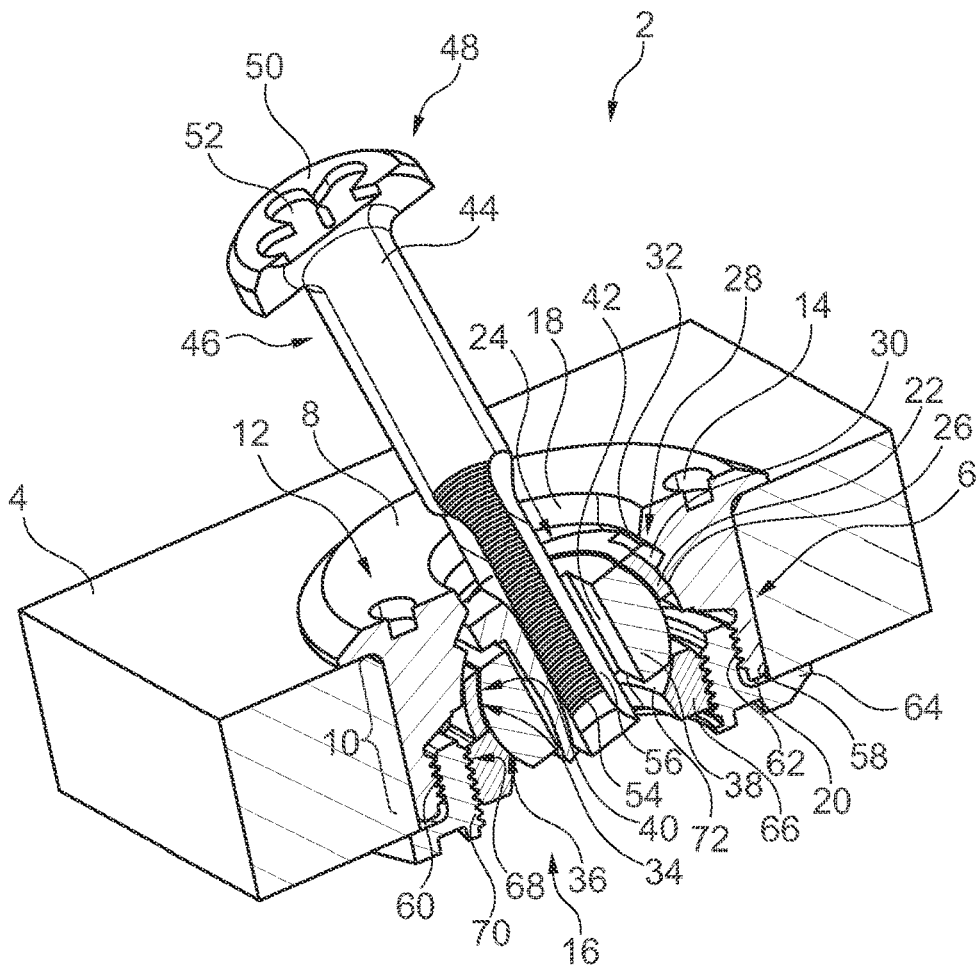
FIGS. 1a and 1b show a fastening device on a surface element having a fastening element.
Figure 1B:
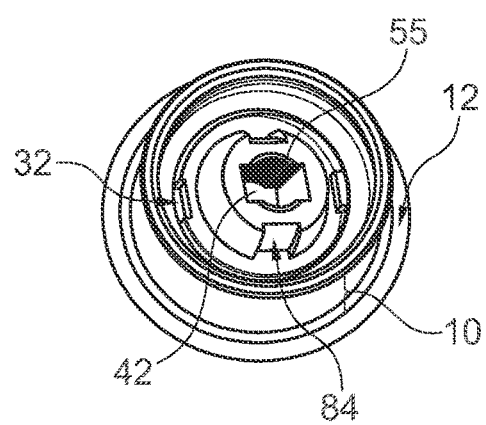
Figure 4:
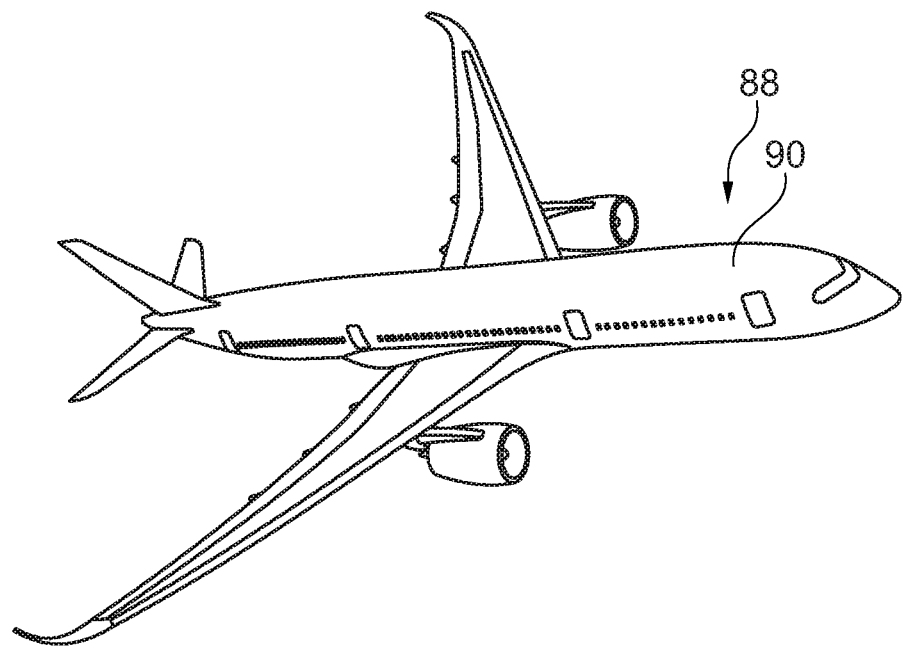
FIG. 4 shows an aircraft having a cabin and a built-in element arranged therein, which is fastened in the cabin by means of a fastening system according to the disclosure.

FIGS. 1a and 1b show a fastening device 2 according to the disclosure in a three-dimensional sectional view. FIG. 1b shows part of the fastening device 2 from below. For illustration, the fastening device 2 is integrated into a surface element 4, which can be a floor or wall element in a cabin of a vehicle, for example. For this purpose, the surface element 4 has a cutout 6, in which a flanged housing 8 is arranged. The flanged housing 8 has a hollow-cylindrical section 10, adjoining which there is an annular flange 12. The hollow-cylindrical section 10 is inserted fully into the aperture 6, with the result that the flange 12 rests on the surface element 4. By way of example, the flange 12 has, on a side facing away from the surface element 4, actuating means 14 into which a tool can be inserted to enable the flanged housing 8 to be rotated or held in a fixed rotational position.

Formed in the flanged housing 8 is an interior space 16, which opens into a passage opening 18 in the flange 12 and a body opening 20 arranged oppositely thereto.

Arranged in the interior space 16 is a hollow-sphere element 22, which has an outer surface 24 that is spherically curved. Corresponding to this is a first spherical bearing surface 26, against which the outer surface 24 of the hollow-sphere element 22 is held in surface contact. The hollow-sphere element 22 can be moved by virtue of the corresponding shaping on the first spherical bearing surface 26.

However, the mobility of the hollow sphere 22 in the interior space 16 can be limited by a first guiding device 28 in the form of a projection 30 and a depression 32, corresponding thereto, in the flanged housing 8. The first guiding device 28 is arranged on two mutually opposite sides of the hollow sphere 22, thereby defining a pivoting plane. In this illustration, just one first guiding device 28 is visible, but this is shown in the subsequent drawings.

On the inside, the hollow-sphere element 22 has a second spherical bearing surface 34, which corresponds to an outer surface 36 of a spherical insert 38. Consequently, the spherical insert 38 is pivotably supported in the hollow-sphere element 22 and, for this purpose, has an outer surface 40, which is likewise spherically curved. There is furthermore there an opening 42, into which a fastening element 44 can be inserted. The spherical insert 38 has a second guiding device (not visible here), which limits the pivoting motion of the spherical insert 38 in a manner similar to the first guiding device 28. The pivoting axes of the hollow-sphere element 22 and of the spherical insert 38 are arranged perpendicularly to one another.

The fastening element 44 is similar in design to a screw bolt and consequently has a stem 46, which extends through the opening 42. A fastening end 48 of the fastening element 44 has a head 50, which is equipped with a profiled depression 52 for connection to a tool. Arranged at an opposite end from the head 50, on two mutually opposite longitudinal sides, are two engagement means 54, wherein those regions of the fastening element 44 which are situated between the second engagement means 54 are implemented in the form of flattened flanks 56. In this illustration, first engagement means in the spherical insert 38 are not visible but are likewise illustrated in the following drawings.

The flanged housing 8 is arranged on the surface element by means of a flanged nut 58. For this purpose, the flanged housing 8 has a first internal thread 60, which corresponds to a first external thread 62 of the flanged nut 58. By arranging a flange 64 on an otherwise hollow-cylindrical section 10, the flanged nut 58 can be screwed into the flanged housing 8 until the flange 64 rests on the surface element 4. The fastening device 2 is thereby integrated fully, with positive and non-positive engagement, on the surface element 4. The two flanges 12 and 64 engage around the surface element 4 on an annular rim in the manner of pincers.

To fasten or hold the components arranged in the interior space 16, a closure element 66 is provided, which is of annular configuration and can be screwed into the closure nut 58. For this purpose, the closure element 66 has a second external thread 68, which corresponds to a second internal thread 70. In addition, the closure element 66 has a third spherical bearing surface 72 of annular design, which is based on a radius of curvature that corresponds to a radius of curvature of the second spherical bearing surface 40 of the hollow sphere 22. Consequently, the hollow-sphere element 22 is completed on an underside, i.e. facing away from the flange 12, by the fastening device 2. As can be seen in FIGS. 1a and 1b, the pivoting motion of the hollow-sphere element 22 too can be limited by forced surface contact with the closure element 66.

The other interrelationships can be seen in the following figures. FIG. 2a shows the fastening device 2 in a plan view. Here, it can be seen that the fastening element 44 is aligned obliquely to one side. This could occur, for example, when a built-in element that is to be fastened on the surface element 4 cannot be attached via a predefined fixed point of the surface element 4, the fastening element 44 instead extending obliquely from the built-in element to the next predefined fixed point of the surface element 4. Two section planes A-A and B-B are indicated, these being shown in FIG. 2b (section A-A) and FIG. 2c (section B-B). Not every element that has already been mentioned above is shown fully in these figures. Only those elements which are missing from the illustration in FIGS. 1a and 1b are explained somewhat more in detail here.

A first guiding device 28 having a projection 30 and a groove 32 can be seen in FIG. 2b. Another first guiding device 28, likewise having a projection 30 and a groove 32, can be seen on the opposite side of the hollow-sphere element 22. It is thereby possible to restrict the possible pivoting motion of the hollow-sphere element 22 exclusively to a first pivoting axis 74.

In this illustration, the flattened shape of the fastening element 44 can furthermore be seen since only the flanks 56 are visible in this perspective. A gap is formed on the right between an inner contour 76 and the flattened flank 56 in the plane of the drawing when the fastening element 44 is in the second rotational position. Here, this gap is filled by a retaining pin 78. This could be elastically deformable and have a certain prestress. Pressing the retaining pin 78 in between the flank 56 and the inner contour 76 of the spherical insert greatly compresses the retaining pin 78, at least in some location or locations, thus securing its position.

FIG. 2c shows section B-B, in which first engagement means 55 can be seen in the opening 42. Two mutually oppositely arranged second guiding devices 80 having projections 82 and grooves 84 can furthermore be seen. By means of these devices, the pivoting motion of the spherical insert 38 is restricted to a second pivoting axis 86, which is perpendicular to the first pivoting axis 74. When the fastening element 44 is fastened, said element can perform a movement in any direction overall. However, it is not possible for the hollow-sphere element 22 or the spherical insert 38 to rotate about their own axis. This enables the fastening element 44 to be introduced from the outside into the opening 42 of the spherical insert 38 in order then to perform a rotation of the fastening element without separately securing the position of the spherical insert 38 or of the hollow-sphere element 22.

Figure 3:
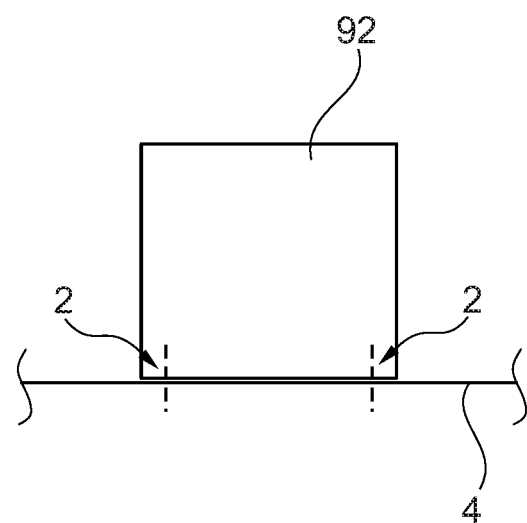
FIG. 3 shows a fastening system having two fastening devices in a very schematic illustration.

FIG. 3 shows a very schematic illustration of a fastening system 85 with the aid of two fastening devices 2 and a fastening element by means of which a built-in element 92 can be attached to a surface element 4.

Finally, FIG. 3 shows a cabin 90 in an aircraft 88, in which is arranged a built-in element fastened by means of at least one fastening device 2 according to the disclosure.

For the sake of completeness, it should be noted that "having" does not exclude any other elements or steps and "a" or "an" does not exclude a multiplicity. It should furthermore be noted that features which have been described with reference to one of the above embodiment examples can also be used in combination with other features of other embodiment examples described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A fastening system for fastening built-in elements in a cabin of a vehicle comprising a fastening element and a fastening device, the fastening device comprising:
   a flanged housing having an interior space formed therein;
   a closure element;
   a hollow-sphere element, which can be inserted into the interior space of the flanged housing; and
   a spherical insert, which can be inserted into the hollow-sphere element and has an opening having first engagement means;
   wherein the interior space of the flanged housing has a first spherical bearing surface, which is configured to correspond to an outer surface of the hollow-sphere element to allow pivoting of the hollow-sphere element, wherein a first guiding device allows pivoting exclusively about a first pivoting axis;
   wherein the hollow-sphere element has on the inside a second spherical bearing surface, which is configured to correspond to an outer surface of the spherical insert to allow pivoting of the spherical insert, wherein a second guiding device allows pivoting exclusively about a second pivoting axis;
   wherein the closure element closes the interior space, at least in some section or sections, in such a way that the hollow-sphere element is held in the interior space;
   wherein the fastening element can be inserted into the spherical insert and has second engagement means; and wherein the first and second engagement means are configured such that, in a first rotational position, the fastening element can be inserted freely into the opening and, in a second rotational position, the first and second engagement means engage in one another.

2. The fastening system according to claim 1, wherein the first pivoting axis and the second pivoting axis are perpendicular to one another.

3. The fastening system according to claim 1, wherein the first pivoting axis and the second pivoting axis are perpendicular to a main direction of extent of the opening of the spherical insert.

4. The fastening system according to claim 1, further comprising a flanged nut with a first external thread, which can be screwed into a first internal thread of the flanged housing to enable the flanged housing and the flanged nut to be fastened in a cutout of a surface component.

5. The fastening system according to claim 1, wherein the closure element has, on a side facing into the interior space, a third spherical bearing surface, which is based on a radius of curvature that corresponds to a radius of curvature of the second spherical bearing surface, with the result that the second spherical bearing surface and the third spherical bearing surface are complementary, at least in some region or regions.

6. The fastening system according to claim 1, wherein the closure element is of substantially annular configuration and has a second external thread, which corresponds to a second internal thread arranged symmetrically with respect to the interior space.

7. The fastening system according to claim 1, wherein the fastening element is elongate and the second engagement means are arranged exclusively on two mutually opposite longitudinal sides, wherein the first engagement means are arranged in a manner complementary thereto in the opening, allowing engagement to be established or released by rotating the fastening element about a longitudinal axis.

8. The fastening system according to claim 7, further comprising at least one retaining pin, which can be inserted between an inner contour of the opening of the spherical insert and the fastening element in the second rotational position of the fastening element.

9. The fastening system according to claim 8, wherein the retaining pin is configured to be elastically deformed and to enter into a nonpositive and/or positive joint with the opening and/or the fastening element when inserted into the opening.

10. The fastening system according to claim 1 and comprising two fastening devices, wherein the fastening element extends through the openings of the spherical inserts of both of the two fastening devices.

11. A cabin for a vehicle, comprising a surface element and a built-in element connected to the surface element by the fastening system according to claim 1.

12. A vehicle comprising the cabin according to claim 11.

13. The vehicle according to claim 12, wherein the vehicle is an aircraft.

* * * * *